(12) United States Patent
Ryou

(10) Patent No.: US 8,277,978 B2
(45) Date of Patent: Oct. 2, 2012

(54) CYLINDER TYPE ZINC-AIR CELL AND METHOD FOR PRODUCING THE SAME

(75) Inventor: Byung Hoon Ryou, Seoul (KR)

(73) Assignee: E.M.W. Energy Co., Ltd., Seoul (KR)

( * ) Notice: Subject to any disclaimer, the term of this patent is extended or adjusted under 35 U.S.C. 154(b) by 913 days.

(21) Appl. No.: 12/278,765

(22) PCT Filed: Feb. 16, 2007

(86) PCT No.: PCT/KR2007/000842
§ 371 (c)(1),
(2), (4) Date: Dec. 10, 2008

(87) PCT Pub. No.: WO2007/094640
PCT Pub. Date: Aug. 23, 2007

(65) Prior Publication Data
US 2009/0142667 A1    Jun. 4, 2009

(30) Foreign Application Priority Data

Feb. 17, 2006    (KR) .................... 20-2006-0004396 U
Feb. 21, 2006    (KR) .................... 20-2006-0004732 U

(51) Int. Cl.
*H01M 4/13*    (2010.01)
*H01M 4/82*    (2006.01)

(52) U.S. Cl. ...................................... 429/229; 29/623.1

(58) Field of Classification Search .................. 429/229; 29/623.1
See application file for complete search history.

(56) References Cited

U.S. PATENT DOCUMENTS 4,247,345 A * 1/1981 Kadija et al. ................. 156/73.4
4,565,002 A    1/1986 Matsuo et al.
5,279,905 A    1/1994 Mansfield, Jr. et al.
5,800,939 A    9/1998 Mishina et al.
5,853,920 A    12/1998 Murakami et al.
6,080,508 A    6/2000 Dasgupta et al.
6,106,975 A    8/2000 Watanabe et al.

(Continued)

FOREIGN PATENT DOCUMENTS

JP    2002373711 A    12/2002
WO    WO 2006/126831 A1 *    11/2006

OTHER PUBLICATIONS

PCT International Search Report for PCT Counterpart Application No. PCT/KR2007/000842 containing Communication relating to the Results of the Partial International Search Report, 2 pgs., (May 28, 2007).

(Continued)

*Primary Examiner* — Karie O'Neill Apicella
(74) *Attorney, Agent, or Firm* — The PL Law Group, PLLC

(57) ABSTRACT

Disclosed herein is a cylindrical zinc-air cell and fabricating method thereof. The zinc-air cell comprises a film including an air anode membrane and a separator, the film being formed in a substantially cylindrical bent shape; and a junction element adapted to receive both ends of the film therein. The junction element is at least partly deformed to pressurize the both ends of the film so as to be joined to the film. By doing so, leakage of the zinc gel can be easily prevented in the fabrication of the cylindrical zinc-air cell, thereby extending the application area of the zinc-air cell.

7 Claims, 5 Drawing Sheets

U.S. PATENT DOCUMENTS

| | | | |
|---|---|---|---|
| 6,127,064 | A | 10/2000 | Shibata et al. |
| 6,524,749 | B1 | 2/2003 | Kaneda et al. |
| 6,548,201 | B1 | 4/2003 | Gibbons et al. |
| 2004/0048146 | A1* | 3/2004 | Adamson et al. ............... 429/83 |
| 2004/0197644 | A1 | 10/2004 | Buckle |

OTHER PUBLICATIONS

Extended European Search Report for EP Counterpart Patent Application No. 07708992.8, 5 pgs. (Sep. 17, 2009).

* cited by examiner

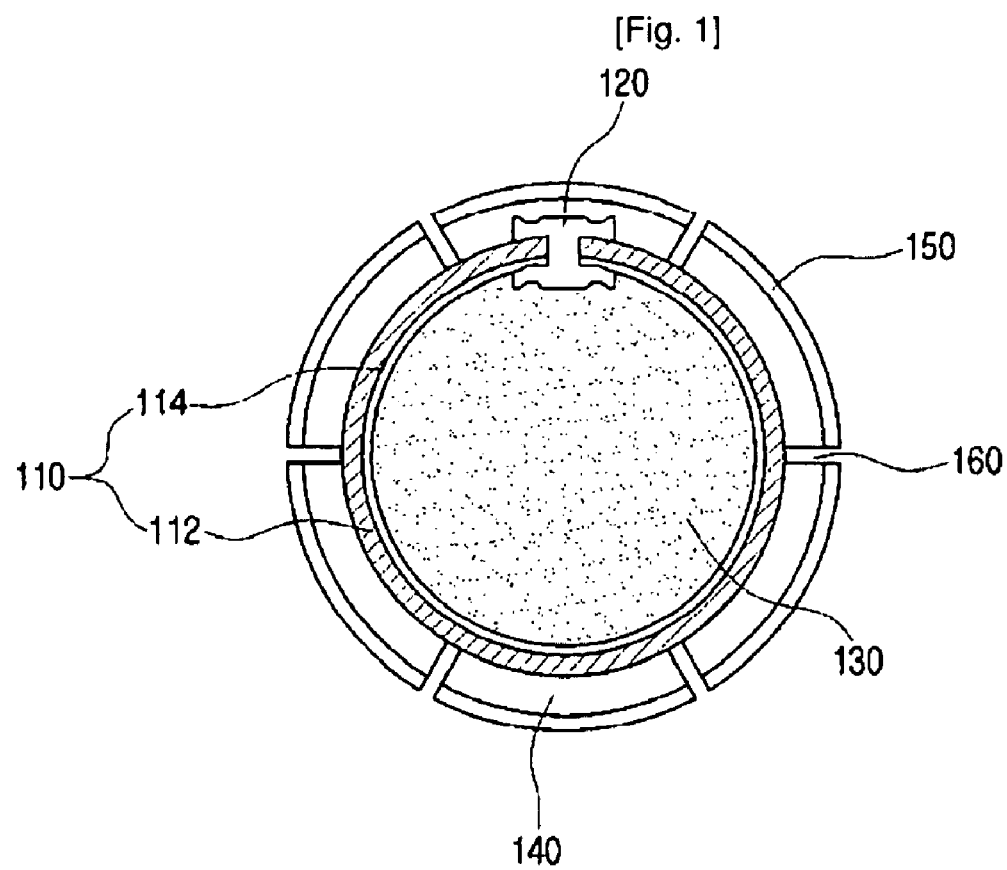
[Fig. 1]
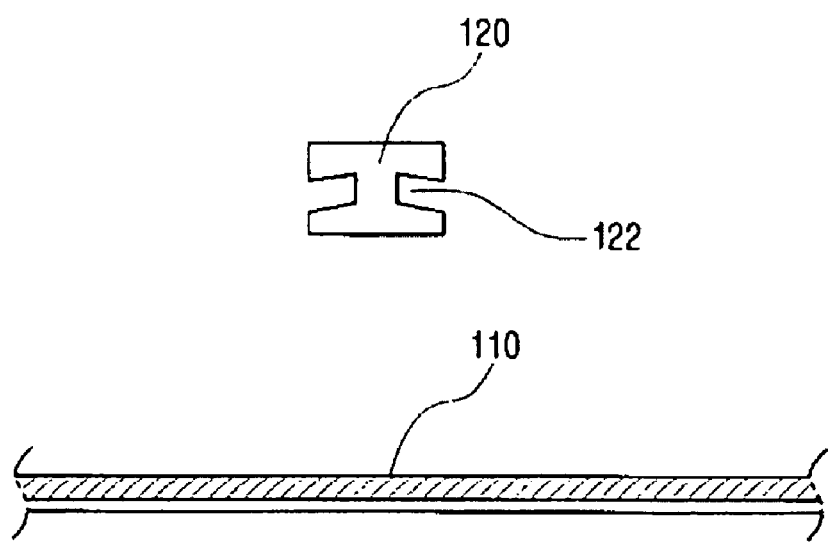
[Fig. 2]

[Fig. 3]
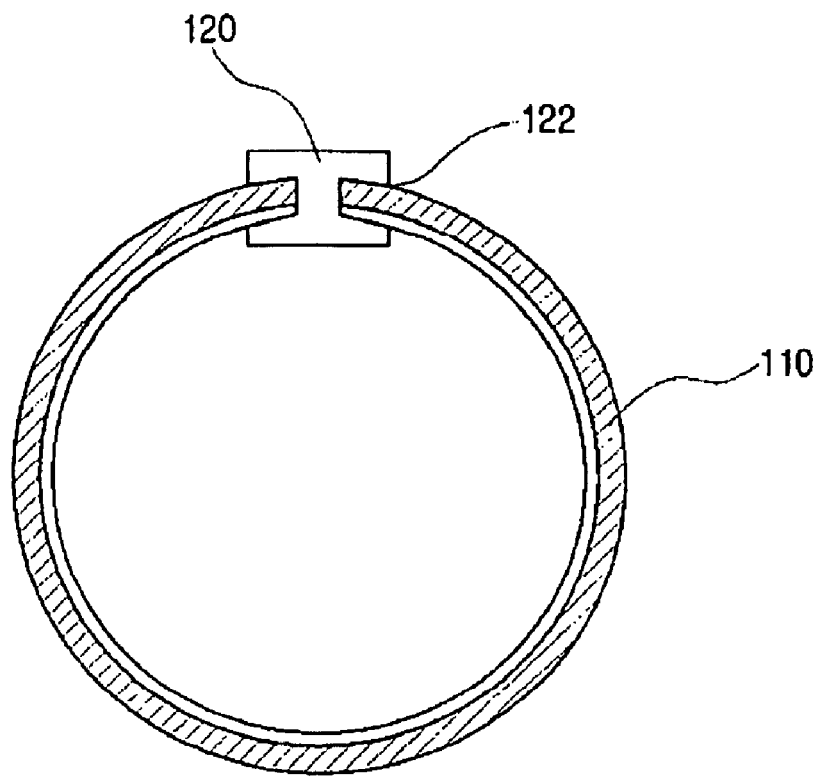
[Fig. 4]
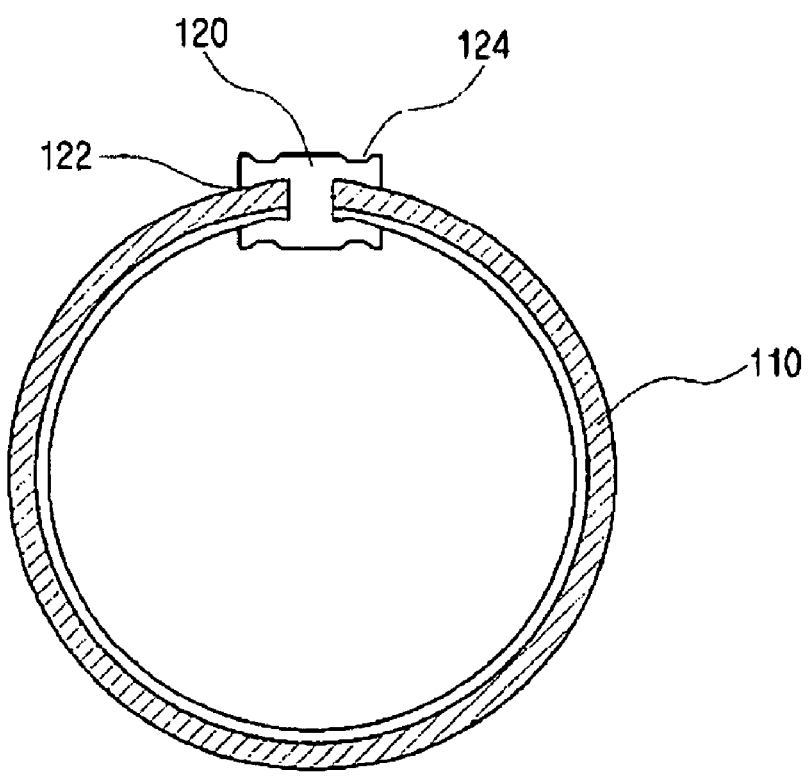

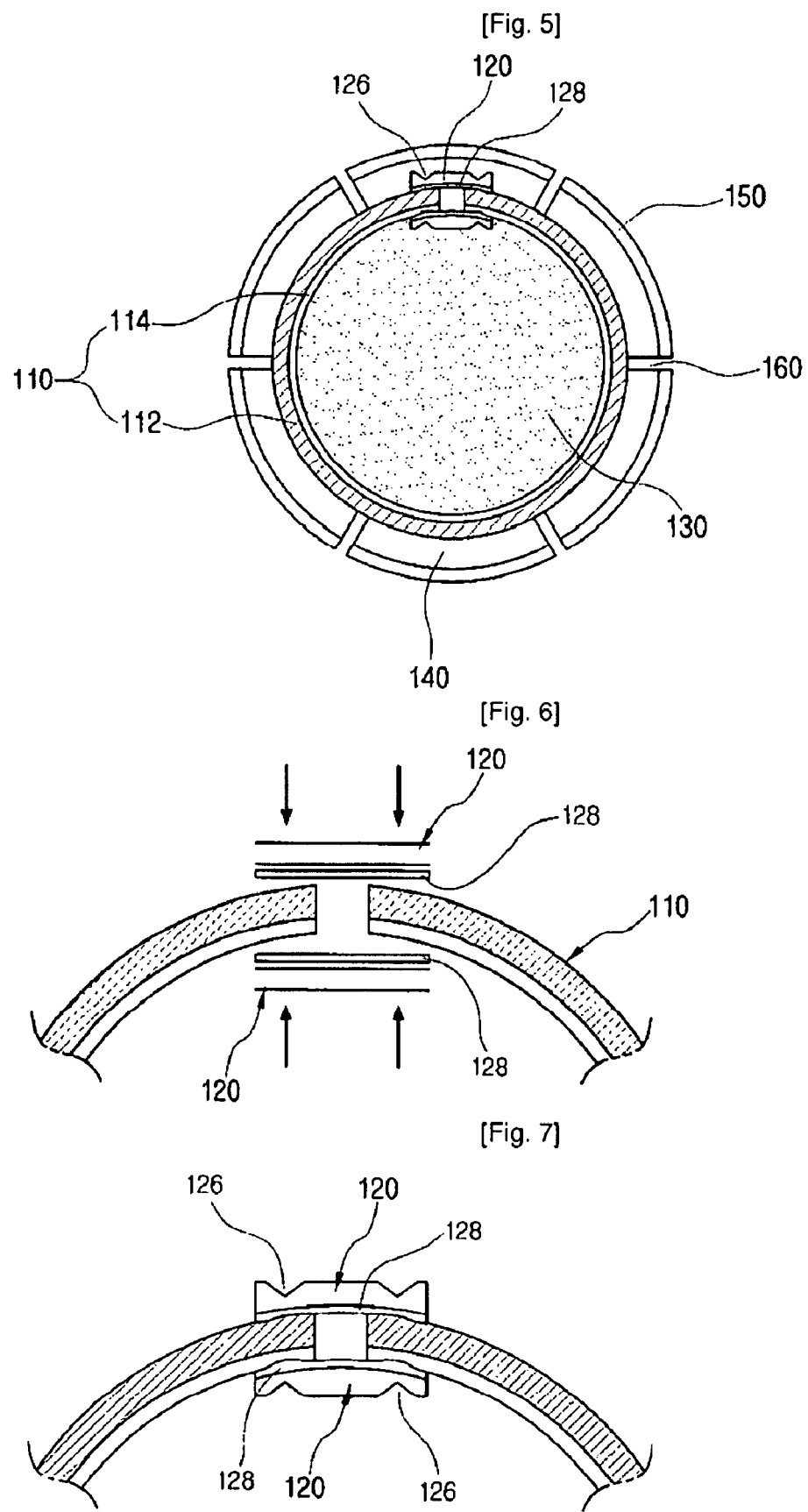

[Fig. 8] Prior Art
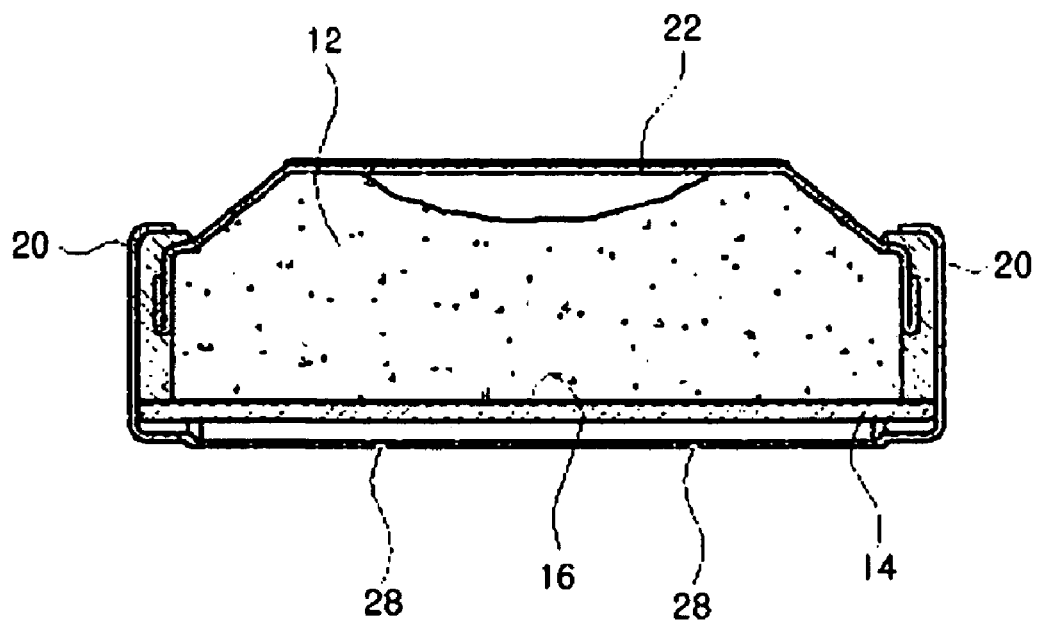
[Fig. 9]
Prior Art
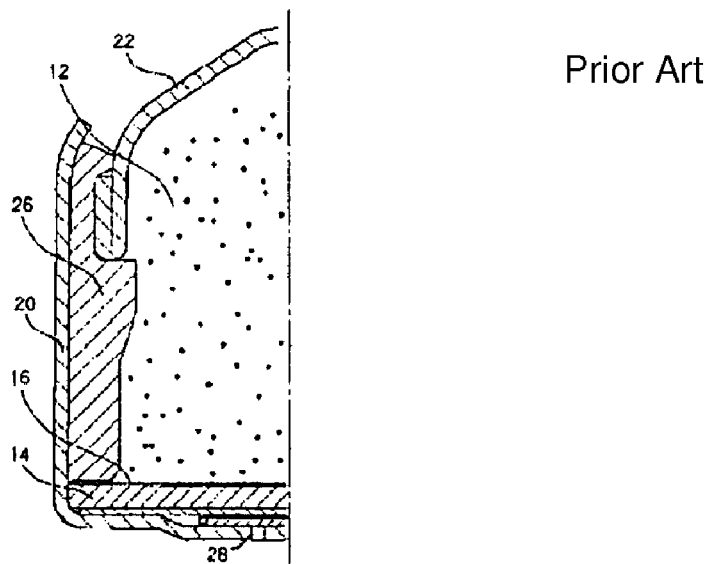

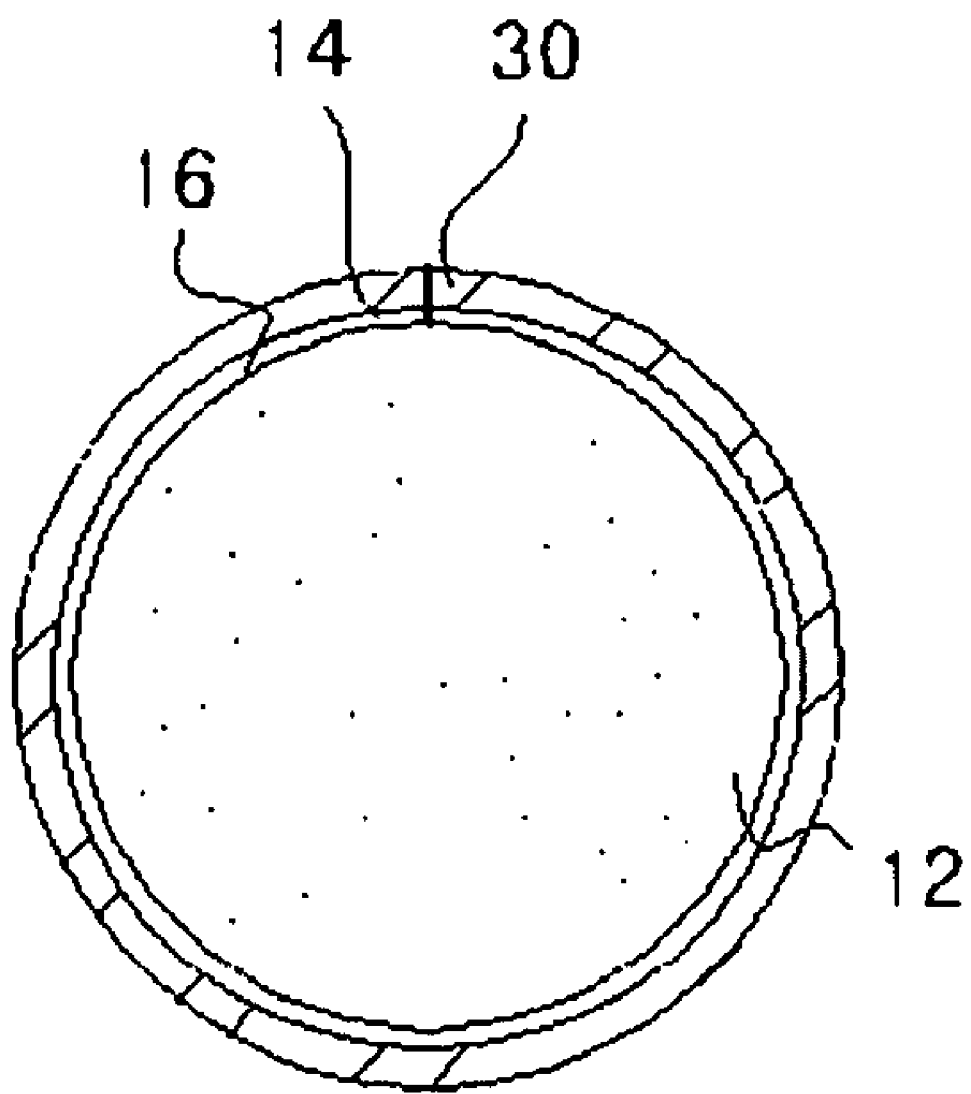
[Fig. 10]

CYLINDER TYPE ZINC-AIR CELL AND METHOD FOR PRODUCING THE SAME

CROSS-REFERENCE TO OTHER APPLICATIONS

This is a National Phase of International Application No. PCT/KR2007/000842, filed on Feb. 16, 2007, which claims priority from Korean Patent Application No. 20-2006-0004396, filed on Feb. 17, 2006 and Korean Patent Application No. 20-2006-0004732, filed on Feb. 21, 2006.

TECHNICAL FIELD

The present invention relates to an zinc-air cell conforming to a cylindrical type standard specification and a method of fabricating the same, and more particularly to, a sealing structure of a film contained in an zinc-air cell.

BACKGROUND ART

Miniaturization of electric devices has been achieved for a long time, and development of lots of portable electric devices has been made. However, recently, as mobile communication is rapidly developed and a new paradigm called the ubiquitous network is introduced, the development of small and easy-to-carry electric devices is on the spotlight. Most electric devices such as MP3 players, digital cameras, mobile phones, PDAs, laptop computers, etc., are made compact and are being evolved in an easy-to-carry form. In addition, an attempt to incorporating various functions into a single device such as an MP3 player, a digital camera, etc., is made along with such miniaturization of electric devices. This attempt provides convenience of use and freedom of migration to a user, but stable supply of electric power is proposed as a new task.

Conventionally, a battery has been widely used as means for supply of power to electric devices. For example, primary batteries such as manganese batteries, alkali manganese batteries, zinc-air batteries and so forth, and secondary batteries such as nickel-cadmium (Ni—Cd) batteries, nickel-metal hydride (Ni—H) batteries, lithium ion batteries and so forth has been used as the power supply means. Among these, the zinc-air battery has a merit that it provides a relatively high voltage of 1.4V and has a high energy density and a large discharge capacity. Further, the zinc-air battery is considered to be a battery capable of substituting for a mercury battery that is restricted in use due to heavy metal content, since it exhibits a nearly uniform discharge characteristic until the discharge of the battery is completed.

Referring to FIG. 8, a conventional button-type zinc-air cell (battery) includes a membrane 14 as an anode, a zinc gel 12 as a cathode and a separator 16 interposed between the membrane and the zinc gel for insulating the membrane and the zinc gel. The membrane and the zinc gel are accommodated in a conductive anode can 20 and conductive cathode can 22, respectively, to form the zinc-air cell.

The membrane 14 is a permeable membrane containing water molecules, which is in contact with oxygen in the air to generate hydroxide ions (OH$^-$). This reaction can be represented in the following chemical formula:

$$O_2 + 2H_2O + 4e^- \leftrightarrow 4OH^-$$ 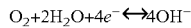 Chemistry Figure 1

In the above reaction, electrons are supplied to the membrane 14 through the anode can 20. Carbon is typically used as a material for the membrane, but a suitable material may be used according to a required voltage or an applicable field.

As such, oxygen is needed for the reaction in the anode, hence the anode should have a path allowing for being in contact with air. Thus, the anode can 20 has air holes 28 formed at the bottom thereof. When the cell is not in use, the air holes 28 are hermetically sealed to suppress the reaction in the anode.

The hydroxide ions generated in the above chemical reaction are transferred to the zinc gel, which is the cathode, through the separator 16. The separator 16 has permeability for the hydroxide ions and has a function of preventing leakage of the zinc gel and insulating the zinc gel from the membrane.

The zinc gel mainly contains zinc powder and has a mixture of an additive and an electrolyte. Typically, potassium hydroxide (KOH) aqueous solution is used as the electrolyte. When the hydroxide ions are transferred to the inside of the zinc gel, the zinc powder reacts with the hydroxide ions to be oxidized. This reaction can be represented in the following chemical formula:

$$Zn + 2OH^- \leftrightarrow Zn(OH)_2 + 2e^-$$ 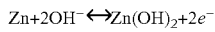

$$Zn + 2OH^- \leftrightarrow ZnO + H_2O + 2e^-$$ 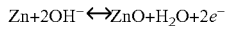 Chemistry Figure 2

By this reaction, electrons are generated from the cathode and then are transferred through the cathode can 22. A maximum voltage of 1.65V can be theoretically generated by such a chemical reactions.

The conventional zinc-air cell was mostly used in only a button-type and in such a button-type zinc-air cell the hermetical sealing thereof is performed using the bending of the can. A method of producing a conventional zinc-air cell is disclosed in Japanese Patent Laid-Open Publication No. 2002-373711.

The method of producing a conventional zinc-air cell will be described hereinafter with reference to FIG. 9. Referring to FIG. 9, the zinc-air cell includes a zinc gel 12 as a cathode, an anode membrane 14 as an anode, and a separator 16 interposed between the membrane and the zinc gel for insulating the membrane and the zinc gel. A cathode can 22 and an anode can 20 that are in contact with the zinc gel 12 and the anode membrane 14, respectively, capture the zinc gel and the anode member. Meanwhile, the anode can 20 has through-holes 28 formed at the bottom thereof so as for the anode membrane (14) to be in contact with air.

A gasket 26 is interposed between the cathode can 22 and the anode can 20 at a distal end of the can, and the anode can 20 and the gasket 26 are bent toward the cathode 22 to achieve the hermetical sealing of the cell.

Such a zinc-air cell has an advantageous property in terms of voltage, energy density, discharge capacity, discharge characteristic, etc. Nevertheless, the application of the zinc-air cell is limited to a special field such as a hearing aid, a camera and the like. Particularly, the zinc-air cell is sold only as a button-type cell and is not manufactured to conform to a cylindrical-type standard specification such as AAA, AA, etc. In order to commercialize a cylindrical zinc-air cell, it is required that the zinc-air cell should be fabricated so as to generate voltage and current suitable for an applicable field to which a cylindrical cell is applied as well as a method itself of producing a cylindrical zinc-air cell should be developed.

A problem associated with the cylindrical zinc-air cell fabricating method will be described hereinafter with reference to FIG. 10. FIG. 10 is a cross-sectional view illustrating a virtual cylindrical zinc-air cell. In FIG. 10, an identical reference numeral is used for the same element as that in FIG. 8. The zinc-air cell includes a zinc gel as a cathode, and hence leakage of zinc gel must be prevented. In the conventional button-type zinc-air cell as shown in FIG. 8, since the anode membrane 14 and the separator 16 are disposed at the lower portion of the zinc gel so that leakage of zinc gel can be prevented, the button-type zinc-air cell is manufactured easily. However, the cylindrical zinc-air cell as shown in FIG. 10 has a structure in which a separator 16 and an anode membrane 14 capture a zinc gel 12. In this case, the anode membrane 14 and the separator 16 have a junction 30 in formation of a cylindrical shape, and hence it is not easy to avoid leakage of the zinc gel.

Therefore, in order to fabricate such a cylindrical zinc-air cell, there is a need for a method of bonding a junction of the anode membrane 14 and the separator 16 while preventing leakage of the zinc gel.

DISCLOSURE OF INVENTION

Technical Problem

Accordingly, the present invention has been made to address and solve the above-mentioned problems occurring in the prior art, and it is an object of the present invention to provide a cylindrical zinc-air cell and a film sealing structure contained in the cylindrical zinc-air cell so as to prevent leakage of a zinc gel.

Technical Solution

To accomplish the above object, according to one aspect of the present invention, there is provided a zinc-air cell comprising: a film including an air anode membrane and a separator, the film being formed in a substantially cylindrical bent shape; and a junction element adapted to receive both ends of the film therein, wherein the junction element is at least partly deformed to pressurize the both ends of the film so as to be joined to the film.

Preferably, the junction element is formed in an H-shape having openings formed at both sides thereof so as to receive the both ends of the film therein.

Preferably, the zinc-air cell further comprises a sealing member interposed between the film and the junction member so as to improve a sealing effect. It is preferred that the junction element comprises two portions disposed at the outer and inner peripheral portions of the cylindrical film, respectively.

Meanwhile, the film may comprise a membrane electrode assembly (MEA).

To accomplish the above object, according to another aspect of the present invention, there is provided a method of fabricating a zinc air cell comprising a film including an air anode membrane and a separator, the film being formed in a substantially cylindrical bent shape, and a junction element adapted to receive both ends of the film therein, the method comprising the steps of: (a) allowing one end of the film to be received in the junction element; (b) at least partly deforming the junction element to join the junction element and the one end of the film; (c) allowing the other end of the film to be received in the junction element; and (d) at least partly deforming the junction element to join the junction element and the other end of the film.

Preferably, the method may further comprise disposing a sealing member on the surface of the one end of the film so as to improve a sealing effect prior to the step (a), wherein the step (a) comprises allowing the one end of the film and the sealing member to be received in the junction element.

Meanwhile, the method may further comprise disposing a sealing member on the surface of the other end of the film so as to improve a sealing effect prior to the step (c), wherein the step (c) comprises allowing the other end of the film and the sealing member to be received in the junction element.

In addition, preferably, the junction element comprises two portions disposed at the outer and inner peripheral portions of the cylindrical film, respectively. The step (b) may be performed after the step (c).

Advantageous Effects

According to the present invention, a simple sealing structure is provided which enables the fabrication of a cylindrical zinc-air cell while interrupting leakage of a zinc gel, so that the zinc-air cell is produced at low cost to conform to a standard specification.

BRIEF DESCRIPTION OF THE DRAWINGS

FIG. 1 is a cross-sectional view illustrating a zinc-air cell according to a first embodiment of the present invention;

FIGS. 2 to 4 are views illustrating a process of fabricating a zinc-air cell according to the first embodiment of the present invention;

FIG. 5 is a cross-sectional view illustrating a zinc-air cell according to a second embodiment of the present invention;

FIGS. 6 to 7 are views illustrating a process of fabricating a zinc-air cell according to the second embodiment of the present invention;

FIG. 8 is a cross-sectional view illustrating a conventional button-type zinc-air cell according to the prior art;

FIG. 9 is a cross-sectional view illustrating a sealing structure of a conventional button-type zinc-air cell according to the prior art; and FIG. 10 is a cross-sectional view illustrating a imaginary cylindrical zinc-air cell.

MODE FOR THE INVENTION

Description will now be made in detail of preferred embodiments of the present invention with reference to the attached drawings. It will be understood by those skilled in the art that the embodiments described in the specification are merely exemplary and the present invention is not limited thereto.

FIG. 1 is a cross-sectional view illustrating a zinc-air cell according to a first embodiment of the present invention. In this embodiment, a zinc-air cell according to the present invention includes a zinc gel 130 functioning as a cathode, an air anode membrane 112 having a cylindrical shape to capture the zinc gel 130 and functioning as an anode in contact with air, and a separator 114 for interrupting the contact between the air anode membrane 112 and the zinc gel 130. The air anode membrane 112 and the separator 114 can constitute a single film 110. In addition, the film 110 may be a Membrane Electrode Assembly (MEA) and perform the same function as that of the film. It will be easily appreciated by those skilled in the art that the film 110 may comprise other constituent element besides the air anode membrane 112 and the separator 114 for improving the function thereof.

An insulator 140 insulates the film 110. A housing 150 is disposed at the outer periphery of the film 110 for maintaining the form of a cell and protecting the cell from the outside. The housing 150 and the insulator 140 have a plurality of openings 160 formed thereon so as to allow the inner air anode membrane 112 to be in contact with air. But, the housing 150 may be formed of an insulating material and do not include the insulator 140.

The film 110 is bonded and hermetically sealed at both ends thereof by means of a junction element 120 for preventing leakage of the zinc gel 130 to the outside. The junction element 120 may be formed of resin or metal material, but is preferably formed of resin material to increase a sealing efficiency. The junction element 120 may be formed by injection-molding or may be formed by cutting a member made to lengthily extend by means of extrusion or drawing.

The junction element 120 takes an H-shape so as to fill a space defined between both ends of the film 110, and the film 110 may be received in openings formed at both sides of the junction element 120. The junction element 120 is at least partly deformed to pressurize the both ends of the film 110 so as to allow the film and the inner surface of the junction element 120 be sealingly joined to each other. At this time, the junction element 120 may be compressed to the film 110.

A process of fabricating a zinc-air cell according to a first embodiment of the present invention will be described hereinafter with reference to FIGS. 2 to 4.

Referring to FIG. 2, initially, the film 110 and the junction element 120 are prepared. The junction element 120 takes an H-shape and has openings 122 formed at both sides of the junction element 120. Next, as shown in FIG. 3, both ends of the film 110 are received in the openings 122 of the junction element 120. Thereafter, at least a part 124 of the junction element 120 is deformed and the film is pressurized, so that the film 110 and the junction element 120 can be joined to each other while hermetically sealing the inside of the cylindrical film 110. At this time, the junction element 120 can be compressed to the film 110. The joining between the junction element 120 and the film 110 may be performed by a process so-called caulking.

Alternatively, after only one end of the film 110 is received in one of the openings 122 of the junction element 120, the joining between the junction element 120 and the one end of the film 110 is performed, and then after the other end of the film 110 is received in the other one of the openings 122 of the junction element 120, the joining between the junction element 120 and the other end of the film 110 is performed. It will be clearly understood by those skilled in the art that the sequence of this process can be changed according to a process step associated with the filling of the zinc gel, the coupling of the housing to the film, etc.

FIG. 5 is a cross-sectional view illustrating a zinc-air cell according to a second embodiment of the present invention. In this embodiment, a zinc-air cell according to the present invention has the same construction as in the first embodiment of the present invention except the construction related to the junction element 120 and a sealing member 128 for hermetically sealing the film 110, and hence the detailed description thereof will be omitted hereinafter.

In this embodiment, the zinc-air cell further comprises a sealing member 128 interposed between the junction element 120 and the film 110. The sealing member 128 is aimed to prevent leakage of the zinc gel 130 between the film 110 and the junction element 120, and may be formed of elastic materials including rubber to increase a sealing efficiency.

Since the interposition of the sealing member 128 eliminates the necessity for the filling up of a space defined between both ends of the film 110, the junction element 120 may not take an H-shape. Alternatively, the junction element 120 may comprise two portions disposed at the outer and inner peripheral portions of the cylindrical film 110, respectively. Each portion of the junction element 120 is deformed at at least a part thereof at the outer and inner peripheral portions of the cylindrical film 110, so that the sealing member 128 and the film 110, and the junction element 120 be joined to each other so as to hermetically seal the inside of the cylindrical film.

In this embodiment, since the sealing effect is improved by the sealing member 128, the junction element 120 may be formed of metal material as well as resin material.

A process of fabricating a zinc-air cell according to a second embodiment of the present invention will be described hereinafter with reference to FIGS. 6 to 7.

First, the film 110, the sealing member 128 and the junction element 120 are provided. Subsequently, the sealing member 128 is disposed on the top and bottom surfaces of both ends of the film 110, respectively, and both ends of the film 110 and the sealing member 128 are received in the junction element 120. As shown in FIG. 6, the junction element 120 comprises two portions disposed at the outer and inner peripheral portions of the cylindrical film 110, respectively, and the film 110 and the sealing member 128 may be disposed between the two portions of the junction element 120. Next, at least a part 126 of the junction element 120 is deformed and the sealing member 128 and the film 110 are pressurized, so that the sealing member 128, the film 110 and the junction element 120 can be joined to each other while hermetically sealing the inside of the cylindrical film 110 (FIG. 7). At this time, the deformation of the junction element 120 may be carried out by a caulking process.

In the meantime, it will be clearly appreciated by those skilled in the art that the joining among the film 110, the sealing member 128 and the junction element 120 may be performed separately with respect to the both ends of the film 110, and the sequence of a process step can be changed.

While the invention has been described in connection with specific embodiments of the invention, it is to be understood that they are merely exemplary and present invention is not limited to the disclosed embodiments. Therefore, a person skilled in the art can perform various changes and modifications based on a principle of the present invention. For example, a person skilled in the art can select an optimal material for each element to improve the performance of the cell, or select an optimal method for fabricating each element. Also, the person skilled in the art may modify the order of the aforementioned steps or add other step. However, these changes and modifications are based on the spirit of the present invention and hence do not depart from the scope of the present invention. Therefore, the scope of the present invention should be defined by the accompanying claims and equivalents thereof.

What is claimed is:

1. A zinc-air cell comprising:
   a film including an air anode membrane and a separator, the film being formed in a substantially cylindrical bent shape; and
   a junction element adapted to receive both ends of the film therein, wherein at least a portion of the junction element is configured to be deformed to pressurize the both ends of the film so as to be joined to the film, wherein the junction element is formed in an H-shape having openings at both sides thereof to position the both ends of the film between portions of the H-shaped junction element.

2. The zinc-air cell according to claim 1, further comprising a sealing member interposed between the film and the junction member so as to improve a sealing effect.

3. The zinc-air cell according to claim 1, wherein the film comprises a membrane electrode assembly (MEA).

4. A method of fabricating a zinc air cell comprising a film including an air anode membrane and a separator, the film being formed in a substantially cylindrical bent shape, and a junction element adapted to receive both ends of the film therein, the method comprising:
(a) allowing one end of the film to be received in the junction element, wherein the junction element is formed in an H-shape to have openings at both sides of the junction element to position the one end of the film between portions of the junction element;
(b) at least partly deforming the junction element to join the junction element and the one end of the film;
(c) allowing the other end of the film to be received in the junction element; and
(d) at least partly deforming the junction element to join the junction element and the other end of the film.

5. The method according to claim 4, further comprising disposing a sealing member on the surface of the one end of the film so as to improve a sealing effect prior to the step (a), wherein the step (a) comprises allowing the one end of the film and the sealing member to be received in the junction element.

6. The method according to claim 4, further comprising disposing a sealing member on the surface of the other end of the film so as to improve a sealing effect prior to the step (c), wherein the step (c) comprises allowing the other end of the film and the sealing member to be received in the junction element.

7. The method according to claim 4, wherein the step (b) is performed after the step (c).

* * * * *